US009647823B2

(12) United States Patent
Bhat et al.

(10) Patent No.: US 9,647,823 B2
(45) Date of Patent: May 9, 2017

(54) ENHANCED SCHEDULING PROCEDURE FOR FULL DUPLEX ACCESS POINT

(71) Applicant: QUALCOMM Incorporated, San Diego, CA (US)

(72) Inventors: Aimer Bhat, Bangalore (IN); Venu Pakalapaty, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/715,839

(22) Filed: May 19, 2015

(65) Prior Publication Data

US 2016/0344532 A1 Nov. 24, 2016

(51) Int. Cl.
| | | |
|---|---|---|
| *H04B 7/00* | (2006.01) | |
| *H04L 5/14* | (2006.01) | |
| *H04W 72/04* | (2009.01) | |
| *H04W 64/00* | (2009.01) | |
| *H04L 12/26* | (2006.01) | |
| *H04W 88/08* | (2009.01) | |
| *H04W 72/12* | (2009.01) | |

(52) U.S. Cl.
CPC ............ *H04L 5/14* (2013.01); *H04L 43/0864* (2013.01); *H04W 64/003* (2013.01); *H04W 72/0406* (2013.01); *H04W 88/08* (2013.01); *H04W 72/121* (2013.01)

(58) Field of Classification Search
CPC .. H04L 5/14; H04L 43/0864; H04W 72/0406; H04W 64/003; H04W 88/02; H04W 88/08
USPC .......................................................... 370/277
See application file for complete search history.

(56) References Cited

U.S. PATENT DOCUMENTS

| | | | | |
|---|---|---|---|---|
| 2008/0070564 | A1* | 3/2008 | Li ........................ | H04B 7/0439 455/424 |
| 2010/0142417 | A1* | 6/2010 | Kim ................... | H04B 7/15557 370/281 |

(Continued)

FOREIGN PATENT DOCUMENTS

| | | |
|---|---|---|
| EP | 2858398 A1 | 4/2015 |
| WO | WO-0126253 A1 | 4/2001 |
| WO | WO-2015039094 A1 | 3/2015 |

OTHER PUBLICATIONS

Sabharwal A., et al., "In-Band Full-Duplex Wireless: Challenges and Opportunities," 2014, 22 pages.

(Continued)

*Primary Examiner* — Mang Yeung
(74) *Attorney, Agent, or Firm* — Holland & Hart LLP

(57) ABSTRACT

Methods, systems, and devices are described for wireless communication at an access point (AP). A scheduling procedure for using a full duplex wireless local area network (WLAN) AP with legacy station (STA) compatibility (e.g., half duplex) may be implemented. For example, a system may include a full duplex AP and have half duplex STAs with two antennas each. The scheduling procedure may involve dynamic grouping of STAs into half duplex sets, for example, based at least in part on location information of the STAs. The STAs may be grouped such that the AP is able to transmit to one of the half duplex sets while concurrently receiving from another of the half-duplex sets. The AP may employ beamforming, via the STAs, to reduce interference between full duplex in-band communications.

27 Claims, 11 Drawing Sheets

(56) References Cited

U.S. PATENT DOCUMENTS

| | | | |
|---|---|---|---|
| 2012/0201173 A1 | 8/2012 | Jain et al. | |
| 2013/0128802 A1* | 5/2013 | Park | H04B 7/15592 |
| | | | 370/315 |
| 2013/0155912 A1 | 6/2013 | Khojastepour et al. | |
| 2013/0301484 A1 | 11/2013 | Khandani | |
| 2015/0016309 A1 | 1/2015 | Fang et al. | |

OTHER PUBLICATIONS

Everett et al., "Empowering Full-Duplex Wireless Communication by Exploiting Directional Diversity", 2011 Conference Record of the Forty Fifth ASILOMAR Conference on Signals, Systems and Computers, Nov. 6, 2011, pp. 2002-2006, ISBN: 978-1-4673-0321-7, DOI: 10.1109/ACSSC.2011.6190376, XP032172427, Institute of Electrical and Electronics Engineers.

ISA/EP, International Search Report and Written Opinion of the International Searching Authority, Int'l Application No. PCT/US2016/032893, Sep. 20, 2016, European Patent Office, Rijswijk, NL, 14 pgs.

\* cited by examiner

ENHANCED SCHEDULING PROCEDURE FOR FULL DUPLEX ACCESS POINT

BACKGROUND

Field of the Disclosure

The following relates generally to wireless communication, and more particularly to providing full duplex operation at an access point.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), may include an access point (AP) that may communicate with one or more stations (STAs) or mobile devices. The AP may be coupled to a network, such as the Internet, and may enable a mobile device to communicate via the network (or communicate with other devices coupled to the access point in a service set, e.g., a basic service set (BSS) or extended service set (ESS)). A wireless device may communicate with a network device bi-directionally. For example, in a WLAN, a STA may communicate with an associated AP via downlink (DL) and uplink (UL). From the STA's perspective, the DL (or forward link) may refer to the communication link from the AP to the station, and the UL (or reverse link) may refer to the communication link from the station to the AP.

A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

Current wireless systems are half duplex, using either time division duplex (TDD—e.g., WLAN) or frequency division duplex (FDD—e.g., cellular). The main issue for implementing full duplex in band communications (i.e., simultaneous transmission (Tx) and reception (Rx) in the same band) is self-interference (SI). Researchers have shown that analog cancellation in the radio frequency (RF) front end followed by digital cancellation in the baseband can nullify/mitigate SI.

SUMMARY

Systems, methods, and apparatuses for full duplex operation at an access point are described. In a wireless communication system, a scheduling procedure for using a full duplex wireless local area network (WLAN) access point (AP) with legacy station (STA) compatibility (e.g., half duplex) may be implemented. For example, a system may include a full duplex AP and have half duplex STAs with two antennas each. The scheduling procedure may involve dynamic grouping of STAs into half duplex sets, for example, based at least in part on location information of the STAs. The STAs may be grouped such that the AP is able to transmit to one of the half duplex sets while concurrently receiving from another of the half-duplex sets. The AP may employ beamforming in the downlink direction and the STAs may employ beamforming in the uplink direction to reduce interference between full duplex in-band communications.

A method for wireless communication is described. The method may involve receiving by an access point (AP) an uplink transmission from a first station (STA), and sending a downlink transmission from the AP to a second STA. At least a portion of time for sending the downlink transmission may be concurrent with at least a portion of time for receiving the uplink transmission. The first STA may be assigned to a first half duplex set of STAs for the AP, and the second STA may be assigned to a second half duplex set of STAs for the AP.

The method may further include sending a downlink transmission from the AP to a STA of the first half duplex set of STAs, and receiving an uplink transmission from a STA of the second half duplex set of STAs. At least a portion of time for sending the second downlink transmission may be concurrent with at least a portion of time for receiving the second uplink transmission.

The method may include obtaining by the AP location information for the first STA and the second STA. In such case, the method also may include identifying the first STA as belonging to the first half duplex set based at least in part on the location information of the first STA, and identifying the second STA as belonging to the second half duplex set based at least in part on the location information of the second STA.

The location information may be based at least in part on at least one selected from the group consisting of: round trip time (RTT) and direction of arrival (DoA) of signals between STAs and the AP.

Identifying the first STA as belonging to the first half duplex set may be based at least in part on an average physical distance between the STAs of the first half duplex set and the STAs of the second half duplex set. In such case, the first STA may be identified as belonging to the first half duplex set if the average physical distance between STAs of the first half duplex set and STAs of the second half duplex set is greater than a threshold distance. Alternatively or additionally, the first STA may be identified as belonging to the first half duplex set if the average physical distance between STAs of the first half duplex set and STAs of the second half duplex set is maximized.

The method may include excluding at least one STA from both the first half duplex set and the second half duplex set based at least in part location information for the at least one STA.

The method may include providing beamforming parameters to STAs of at least one of the half duplex sets. In such cases, full-duplex operations of the AP using the beamforming parameters may reduce interference between the half-duplex sets.

The method may involve determining, using a sounding operation, channel state information (CSI) of at least one selected from the group consisting of: a channel between the AP and the first STA, a channel between the AP and the second STA and a channel between the first STA and the second STA. In such case, the beamforming parameters may be determined based at least in part on the determined CSI.

An apparatus for wireless communication also is described. The apparatus may include a receiver of an access point (AP) to receive an uplink transmission from a first station (STA); and a transmitter of the AP to send a downlink transmission from the AP to a second STA, wherein at least a portion of time for sending the downlink transmission is concurrent with at least a portion of time for receiving the uplink transmission, the first STA is assigned to a first half duplex set of STAs for the AP, and the second STA is assigned to a second half duplex set of STAs for the AP. The apparatus may include these and other features to perform the various functions described above and further herein.

Another apparatus for wireless communication is described. The apparatus may include: means for receiving by an access point (AP) an uplink transmission from a first station (STA) to an access point (AP); and means for sending a downlink transmission from the AP to a second STA, wherein at least a portion of time for sending the downlink transmission is concurrent with at least a portion of time for receiving the uplink transmission, the first STA is assigned to a first half duplex set of STAs for the AP, and the second STA is assigned to a second half duplex set of STAs for the AP. The apparatus may include these and other features to perform the various functions described above and further herein.

A non-transitory computer-readable medium is described. The medium may store computer-executable code for wireless communication. The code may be executable by a processor to cause a device to: receive by an access point (AP) an uplink transmission from a first station (STA); and, send a downlink transmission from the AP to a second STA, wherein at least a portion of time for sending the downlink transmission is concurrent with at least a portion of time for receiving the uplink transmission, the first STA is assigned to a first half duplex set of STAs for the AP, and the second STA is assigned to a second half duplex set of STAs for the AP. The code may be executable by the processor to cause the device to perform these and other features as described above and further herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to improved systems, methods, or apparatuses for providing full duplex wireless communication at an access point (AP). An AP may implement a scheduling procedure that allows the AP to operate in a full duplex mode with half duplex (e.g., legacy) stations (STAs).

The SA may involve dynamic grouping of STAs into half duplex sets (e.g., a first set and a second set) so that the AP may simultaneously communicate with at least one STA of the first half duplex set and at least one STA of the second half duplex set. For example, the AP may receive an uplink transmission from a STA of the first half duplex set and simultaneously send a downlink transmission to a STA of the second half duplex set, or vice versa.

The AP may divide a plurality of STAs into a first half duplex set and a second half duplex set, for example, using location information of the STAs. The AP may obtain the location information of the STAs either directly or indirectly from the STAs. Alternatively, the AP may determine the location information in a suitable manner, such as using round trip time (RTT) and/or direction of arrival of signals between the AP and the individual STAs.

The AP may provide beamforming parameters (e.g., as part of beamforming instructions) to the STAs of at least one of the half duplex sets. The beamforming parameters may be configured to reduce interference between the half duplex sets during the full duplex operations at the AP. The AP may obtain or otherwise determine channel state information (CSI), for example, using a sounding operation. The AP may use the CSI in determining the beamforming parameters for the STAs to employ.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
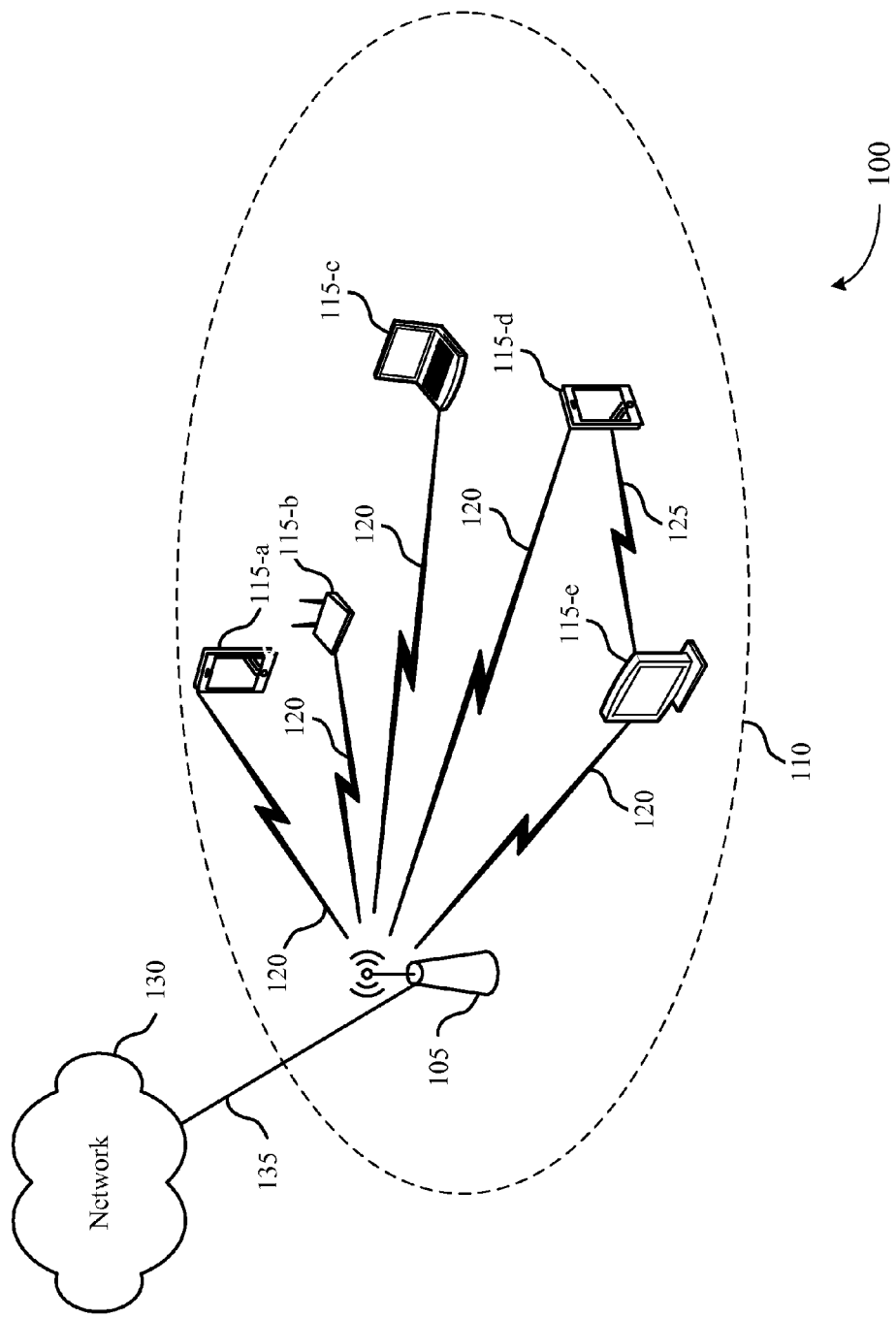
FIG. 1 shows a block diagram of a wireless communication system, in accordance with various aspects of the present disclosure.

FIG. 1 illustrates a wireless local area network (WLAN) 100 (e.g., a Wi-Fi network) configured in accordance with various aspects of the present disclosure. The WLAN 100 may include an access point (AP) 105 and multiple associated wireless stations (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. Each of the STAs 115, which may also be referred to as mobile stations (MSs), mobile devices, access terminals (ATs), user equipment (UE), subscriber stations (SSs), or subscriber units, may associate and communicate with the AP 105 within a geographic coverage area 110 of the AP 105 via a respective communication link 120. In some cases, the communication links 120 may be implemented using beamforming.

Although not shown in FIG. 1, a STA 115 may be covered by more than one AP 105 and may therefore associate with one or more APs 105 at different times. The AP 105 and the associated STAs 115 may represent a basic service set (BSS) or an extended service set (ESS). A single AP and an associated set of stations may be referred to as a basic service set (BSS). An extended service set (ESS) is a set of connected BSSs. A distribution system (DS) (not shown) maybe used to connect APs 105 in an extended service set. The geographic coverage area 110 for the AP 105 may be divided into sectors (not shown) making up only a portion of the coverage area. The WLAN 100 may include APs 105 of different types (e.g., metropolitan area, home network, etc.), with varying sizes of coverage areas and overlapping coverage areas for different technologies.

While the STAs 115 may communicate with each other through the AP 105 using communication links 120, each STA 115 may also communicate directly with one or more other STAs 115 via a direct wireless link 125. Two or more STAs 115 may communicate via a direct wireless link when both STAs 115 are in the AP geographic coverage area 110 or when one or neither STA 115 is within the AP geographic coverage area 110 (not shown). Examples of the direct wireless link 125 may include Wi-Fi Direct connections, connections established by using a Wi-Fi Tunneled Direct Link Setup (TDLS) link, and other P2P group connections.

STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11 ac, 802.11 ad, 802.11 ah, etc. In other implementations, peer-to-peer connections or ad hoc networks may be implemented within WLAN 100.

The AP 105 may communicate with a network 130, such as the Internet, via a wired or wireless communication link 135. The AP 105 may receive data from the network 130 which is intended for a single STA 115, or multiple STAs 115, within the geographic coverage area 110. Accordingly, the AP 105 may transmit data via unicast (e.g., one-to-one) or multicast (e.g., one-to-many) transmissions to STAs 115.

The AP 105 may be capable of performing full duplex communications. The STAs 115, however, may be capable of only half duplex communications, for example. In such case, the AP 105 may provide full duplex communications with the STAs 115 by dividing the STAs into different half duplex sets or groups. The AP 105 may, for example, divide the STAs 115 shown in FIG. 1 into a first half duplex set including STA 115-$a$ and STA 115-$b$ and a second half duplex set including STA 115-$c$, STA 115-$d$ and STA 115-$e$.

The AP 105 may divide the STAs 115 into half duplex sets using information regarding the locations of the STAs 115. In this example, the first half duplex set may include STAs 115-$a$ and 115-$b$ and the second half duplex set may include STAs 115-$c$, 115-$d$ and 115-$e$ in view of their relative locations—STAs 115-$a$ and 115-$b$ being relatively close together and spaced apart from STAs 115-$c$, 115-$d$ and 115-$e$, which are relatively close together. In some cases, the relative locations of the STAs to the AP 105 may be taken into account as well. Using location information of the STAs to divide the STAs into different sets may result in the first half duplex set being separated from the second half duplex set by a physical distance, which may help to reduce interference between communications when the AP 105 is communicating with both half duplex sets (e.g., one or more STA 115 of each set) during full duplex operation at the AP 105.

Figure 2A:
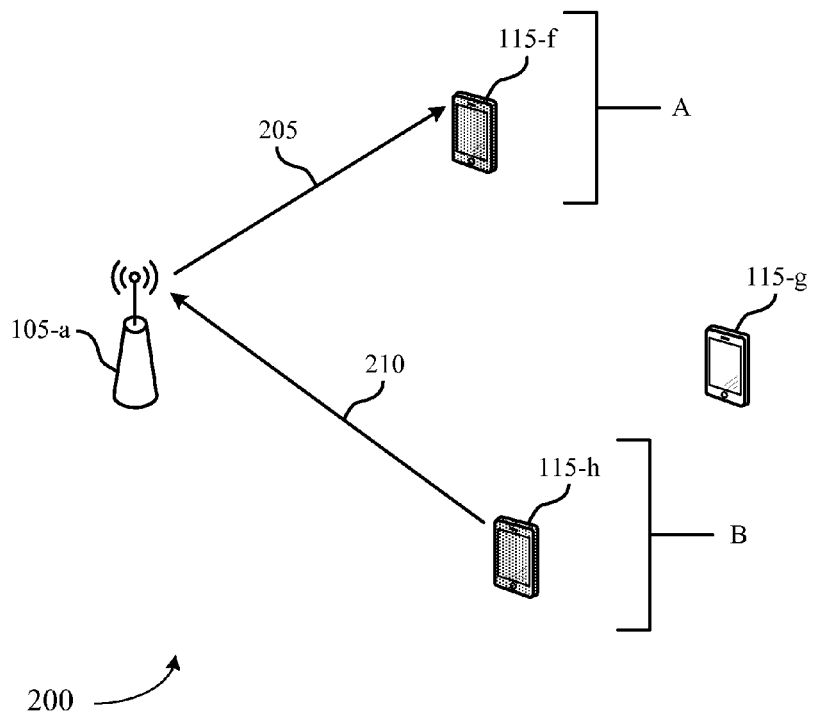
FIGS. 2A and 2B show block diagrams illustrating a wireless communication system performing full duplex communications, in accordance with various aspects of the present disclosure.

FIG. 2A shows a block diagram illustrating a wireless communication system 200 performing full duplex communications. The wireless communication system 200 may include an AP 105-$a$ and a plurality of associated STAs 115-$f$, 115-$g$ and 115-$h$. The AP 105-$a$ may be an example of the AP 105 described with reference to FIG. 1. Also, the STAs 115-$f$, 115-$g$ and 115-$h$ may be examples of one or more of the STAs 115 described with reference to FIG. 1.

As described above with reference to FIG. 1, the AP 105-$a$ may divide the STAs 115-$f$, 115-$g$ and 115-$h$ into half duplex sets. The STA 115-$f$ may be assigned to a first half duplex set A and the STA 115-$h$ may be assigned to a second half duplex set B. The STA 115-$g$ may be excluded from both the first half duplex set A and the second half duplex set B, and may be assigned to a third half duplex set.

Although only three STAs 115-$f$, 115-$g$ and 115-$h$ are shown for the sake of clarity, it should be understood that the STA 115-$f$ may represent a plurality of STAs, the STA 115-$g$ may represent a respective plurality of STAs and the STA 115-$f$ may represent a respective plurality of STAs. As discussed above, the AP 105 may divide the STAs into half duplex sets using location information of the STAs. In the example of FIG. 2A, the STAs 115-$f$, 115-$g$ and 115-$h$ may be located such that dividing the STAs into half duplex sets by assigning STA 115-$f$ to the first half duplex set A and assigning STA 115-$h$ to the second half duplex set B may achieve a physical distance (e.g., average physical distance in the case of multiple STAs being assigned to a set) between the first half duplex set A and the second half duplex set B that enhances full duplex communications with the AP 105 (e.g., by reducing interference between simultaneous communications with the AP 105).

In FIG. 2A, the AP 105 is shown communicating with the first half duplex set A (represented by STA 115-$f$ assigned to the first half duplex set) via a downlink (DL) 205. The AP 105 may concurrently or simultaneously communicate with the second half duplex set B (represented by STA 115-$h$ assigned to the second half duplex set) via an uplink (UL)

210. As such, the AP 105 may perform full duplex communications with the first half duplex set A and the second half duplex set B. Although not shown, it should be understood that the AP 105 may communicate with one or more STAs of the first half duplex set A via the DL 205, and one of more STAs of the second half duplex set B may communicate with the AP 105 via the UL 210. In such case, the AP 105 may employ UL or DL multiple input multiple output (MIMO) techniques (such as in 802.11 ax (UL) and 802.11 ac (DL), and beyond).

Figure 2B:
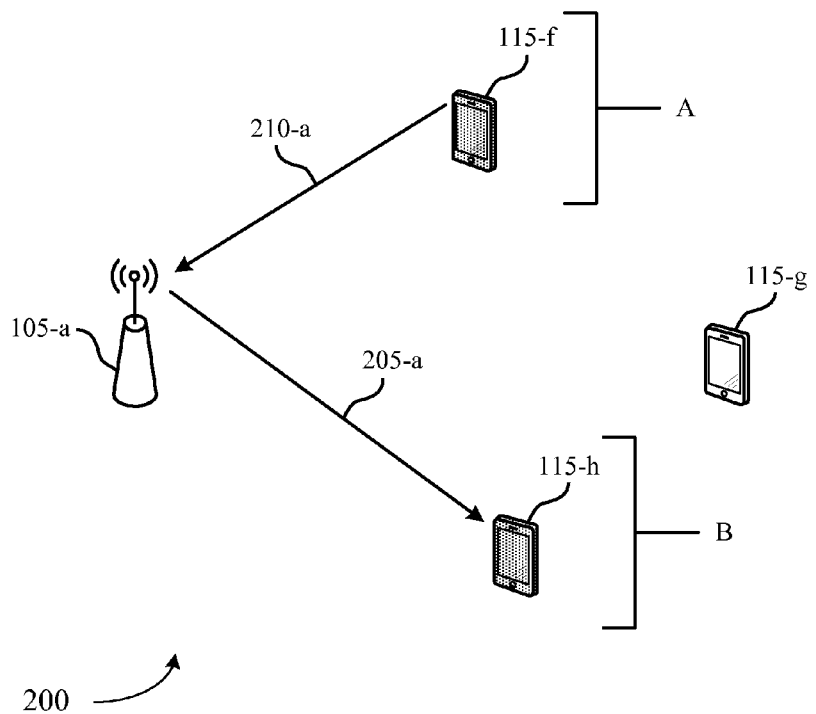

FIG. 2B shows a block diagram illustrating the wireless communication system 200 of FIG. 2A performing full duplex communications. As discussed above, STA 115-$f$ may be assigned to the first half duplex set A and STA 115-$h$ may be assigned to the second half duplex set B. In FIG. 2B, however, the AP 105 is shown communicating with the first half duplex set A via an uplink (UL) 210-$a$. The AP 105 may concurrently or simultaneously communicate with the second half duplex set B via a downlink (DL) 205-$a$. As such, the AP 105 may perform full duplex communications with the first half duplex set A and the second half duplex set B. Although not shown, it should be understood that the AP 105 may communicate with one or more STA of the second half duplex set B via the DL 205-$a$, and one of more STAs of the first half duplex set A may communicate with the AP 105 via the UL 210-$a$.

Although not shown in FIGS. 2A and 2B for the sake of clarity, it should be understood that the AP 105-$a$ may communicate with different pairs of half duplex sets, in DL with one or more STAs of one half duplex set of the pair and in UL with one or more STAs of the other half duplex set of the pair. The AP 105-$a$ may divide the STAs within the coverage area of the AP 105-$a$ into any suitable number of half duplex sets. Further, such half duplex sets may overlap such that a particular STA may be assigned to more than one half duplex set and may participate in communications with the AP 105-$a$ as part of any of the half duplex sets to which the particular STA is assigned, as long as the STA is not scheduled to actively participate in the communications of both half duplex sets as part of the full duplex communications at the AP 105-$a$.

Figure 3:
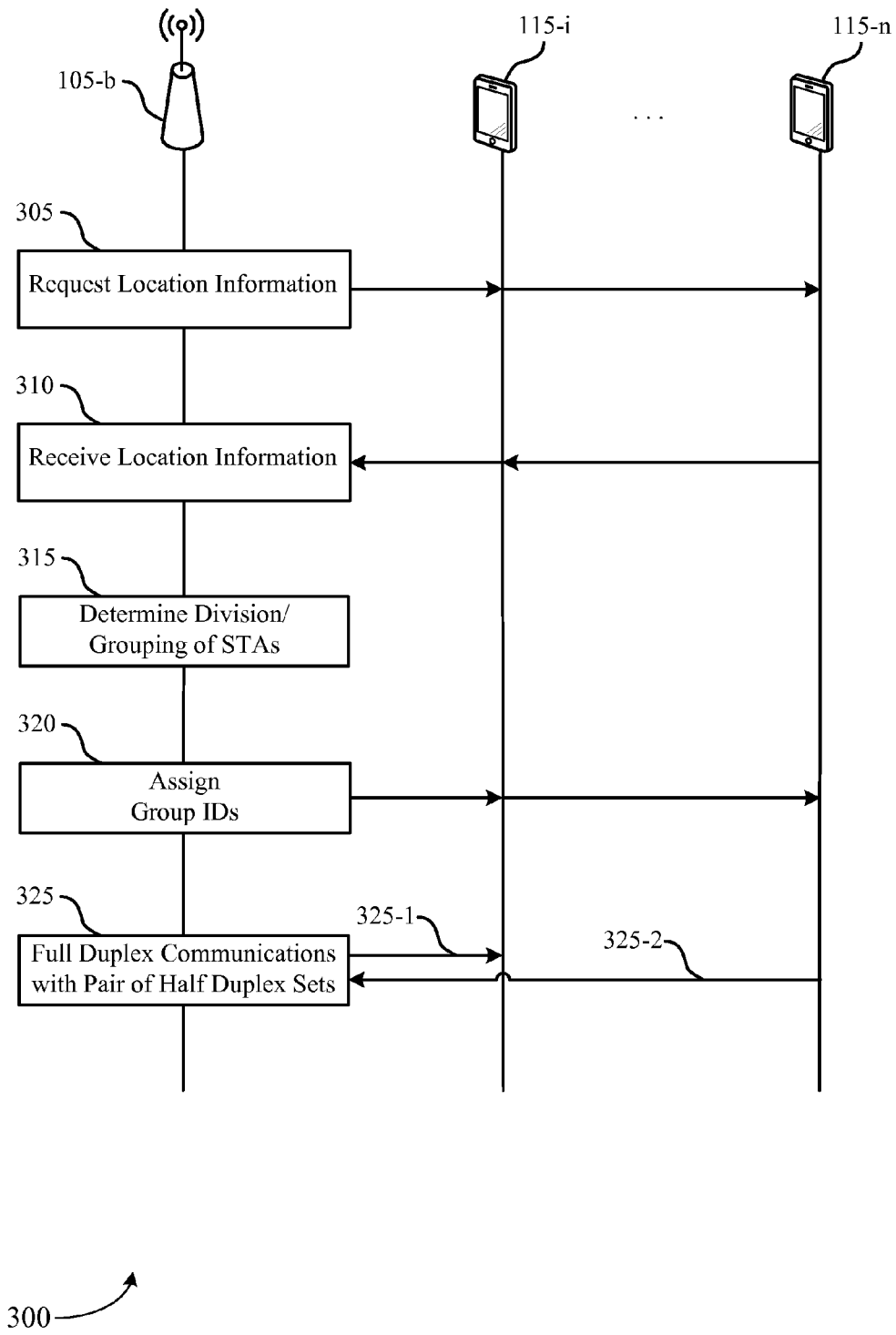
FIG. 3 shows a block diagram illustrating an example of a process flow for providing full duplex communications at an access point (AP), in accordance with various aspects of the present disclosure.

FIG. 3 shows a block diagram illustrating an example of a process flow 300 for providing full duplex communications at an AP 105-$b$ with a plurality of STAs 115-$i$ through 115-$n$ within a coverage area (not shown) of the AP 105-$b$. The AP 105-$b$ may be an example of the AP 105 described with reference to FIG. 1 or the AP 105-$a$ described with reference to FIGS. 2A and 2B. Also, the STAs 115-$i$ through 115-$n$ may be examples of one or more of the STAs 115 described with reference to FIG. 1 or FIGS. 2A and 2B.

At 305, AP 105-$b$ may request location information from the STAs 115-$i$ through 115-$n$. The AP 105-$b$ may communicate individually with the STAs to obtain location information for each STA, or may broadcast a request to reach all STAs within the coverage area. In response to the request, at 310, the AP 105-$b$ may receive location information for each of the STAs 115-$i$ through 115-$n$. Each of the STAs 115-$i$ through 115-$n$ may obtain or otherwise determine location information using any known or hereafter developed technology. For example, each STA may be equipped with hardware and/or software for using a positioning or navigation system (e.g., global positioning system (GPS), mobile position system (MPS), global navigation satellite system (GNSS), Galileo, etc.) to determine location. Alternatively or additionally, each STA may be configured to use triangulation methods (e.g., using known locations of APs and/or other STAs).

Obtaining location information for the STAs (illustrated by 305 and 310 in FIG. 3) may alternatively be accomplished by the AP 105-$b$ determining a location for each of the STAs 115-$i$ through 115-$n$. For example, the AP 105-$b$ may send a locating signal to each STA that causes the individual STA to send a response signal back to the AP 105-$b$ in response. The AP 105-$b$ may determine a round trip time (RTT) for such signals using knowledge of the departure time of the locating signal from the AP 105-$b$, the arrival time of the locating signal at the particular STA (included with the response signal received from the STA), the departure time of the signal from the STA (also included with the response signal) and the arrival time of the response signal at the AP 105-$b$.

Further, the AP 105-$b$ may determine a direction of arrival (DoA) for each response signal returned from the STAs. For example, the AP 105-$b$ may include an antenna array that is configured to identify the DoA of a received signal. Antenna elements of the array may receive different portions (or no portion) of an arriving signal depending on the DoA. The different portions of the signal may cause different signal strengths to be received by the antenna elements, which may be used to determine the DoA. Generally, coherent combining of the received signal by antenna arrays may be used for DoA estimation. As some signal patterns yield a better DoA estimate, such predefined patterns of a signal may be used. Further details are not provided here for the sake of brevity as DoA estimation techniques are known to those skilled in the art.

At 315, AP 105-$b$ may determine, using the location information of the STAs 115-$i$ through 115-$n$, how to divide or group the STAs to support full duplex communications at the AP 105-$b$. As described above with reference to FIGS. 1, 2A and 2B, for example, the AP 105-$b$ may divide the STAs 115-$i$ through 115-$n$ into a plurality of half duplex sets. Further, the AP 105-$b$ may assign the STAs 115-$i$ through 115-$n$ to one or more of the plurality of half duplex sets (or may not assign a particular STA to any of the half duplex sets, thus excluding the particular STA from full duplex communications at the AP 105-$b$).

At 320, the AP 105-$b$ may assign a group identification (ID) to identify each of the half duplex sets, with each of the STAs of a particular half duplex set having the group ID assigned to identify membership in the particular half duplex set. Depending on how the AP 105-$b$ divides the STAs 115-$i$ through 115-$n$ into half duplex sets, each of the STAs 115-$i$ through 115-$n$ may have none, one or several group IDs.

At 325, the AP 105-$b$ may perform full duplex communications with a pair of half duplex sets, such as described above with reference to FIGS. 2A and 2B. In FIG. 3, a DL communication 325-1 is shown from the AP 105-$b$ to STA 115-$i$ and an UL communication is shown from STA 115-$n$ to the AP 105-$b$. It should be understood that these communications are only intended to be illustrative (e.g., with STA 115-$i$ representing one half duplex set and STA 115-$n$ representing another half duplex set), and do not show all possible full duplex communications by the AP 105-$b$.

In the case that the AP 105-$b$ has identified more than two half duplex sets, the AP 105-$b$ may select two of the half duplex sets for full duplex communications at the AP 105-$b$ based at least in part on which STAs the AP 105-$b$ has data to send to. The AP 105-$b$ also may take into account which STAs have data to send to the AP 105-$b$. Such selection may be based at least in part on an overall scheduling of communications at the AP 105-$b$, which may take into account additional or other factors. Thus, the AP 105-$b$ may switch between full duplex communications with different half duplex sets to facilitate efficient communications.

Figure 4A:
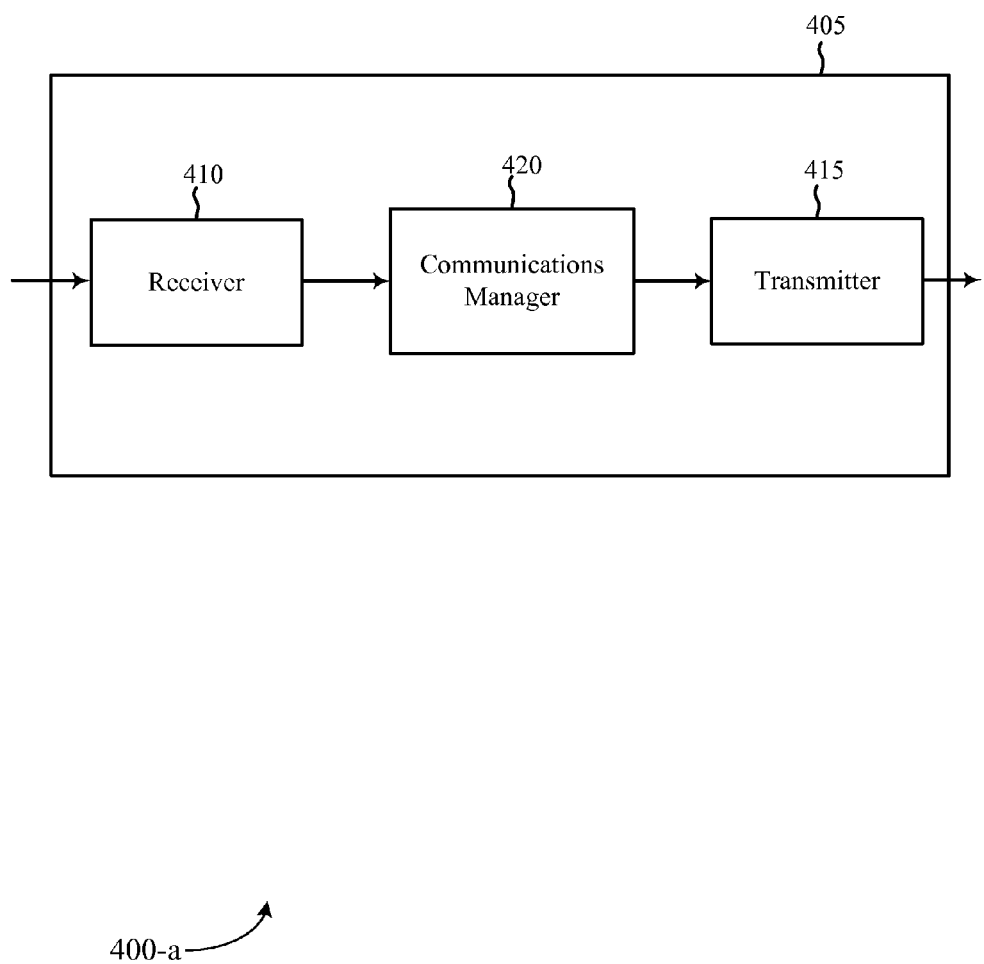
FIG. 4A shows a block diagram illustrating an example of a device that may be used for full duplex communications, in accordance with various aspects of the present disclosure.

FIG. 4A shows a block diagram 400-*a* illustrating an example of a device 405 that may be used for full duplex communications, in accordance with various aspects of the present disclosure. The device 405 may be an example of one or more aspects of a APs 105 described with reference to FIGS. 1, 2A, 2B and 3. The device 405 may include a receiver 410, a communications manager 420, and/or a transmitter 415. The device 405 may also be or include a processor (not shown). Each of these components may be in communication with each other.

The device 405, through the receiver 410, the communications manager 420, and/or the transmitter 415, may perform functions described herein. For example, the device 405 may be configured to divide a plurality of STAs into half duplex sets, obtain (or determine) location information regarding the STAs, assign STAs to one or more half duplex sets, determine channel state information (CSI), determine and/or provide beamforming parameters, etc.

The components of the device 405 (as well as those of other related devices/apparatus described herein) may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 410 may receive information such as packets, user data, and/or control information associated with various information channels (e.g., control channels, data channels, etc.). The receiver 410 may be configured to receive location information from STAs (not shown), such as described above with reference to FIG. 3. Alternatively or additionally, the receiver 410 may be configured to receive signals from STAs in response to a locating signal sent by the device 405 (via the transmitter 415), and further may be configured to obtain information for determine the DoA of such response signals, such as described above with reference to FIG. 3. The receiver 410 also may be configured to receive CSI. Information may be passed on to the communications manager 420, and to other components of the device 405.

The transmitter 415 may transmit one or more signals received from other components of the device 405. The transmitter 415 may transmit information such as packets, data, and/or control information associated with various information channels (e.g., control channels, data channels, etc.). The transmitter 415 may be configured to transmit requests for location information, locating signals, assignments of group IDs, and beamforming parameters and/or instructions. In some examples, the transmitter 415 may be collocated with the receiver 410 in a transceiver module. The transmitter 415 may be configured to operate concurrently or simultaneously with the receiver 410 for full duplex communications at the device 405.

The communications manager 420 may divide a plurality of STAs (not shown) into half duplex sets, such as described above with reference to FIGS. 1, 2A, 2B and 3. The communications manager 420 may obtain or otherwise determine location information regarding the STAs, for example, using the transmitter 415 and/or the receiver 410. The communications manager 420 may manage (e.g., control, format, schedule, etc.) full duplex communications for the device 405, as well as conventional half duplex communications. The communications manager 420 may be configured to operate according to different modes, such as single user (SU), multi-user (MU), single input multiple output (SIMO), multiple input multiple output (MIMO), etc., to facilitate communications. The communications manager 420 may be configured to control or operate in conjunction with other components of the device (e.g., the receiver 410 and the transmitter 415) to carry out various operations.

Figure 4B:
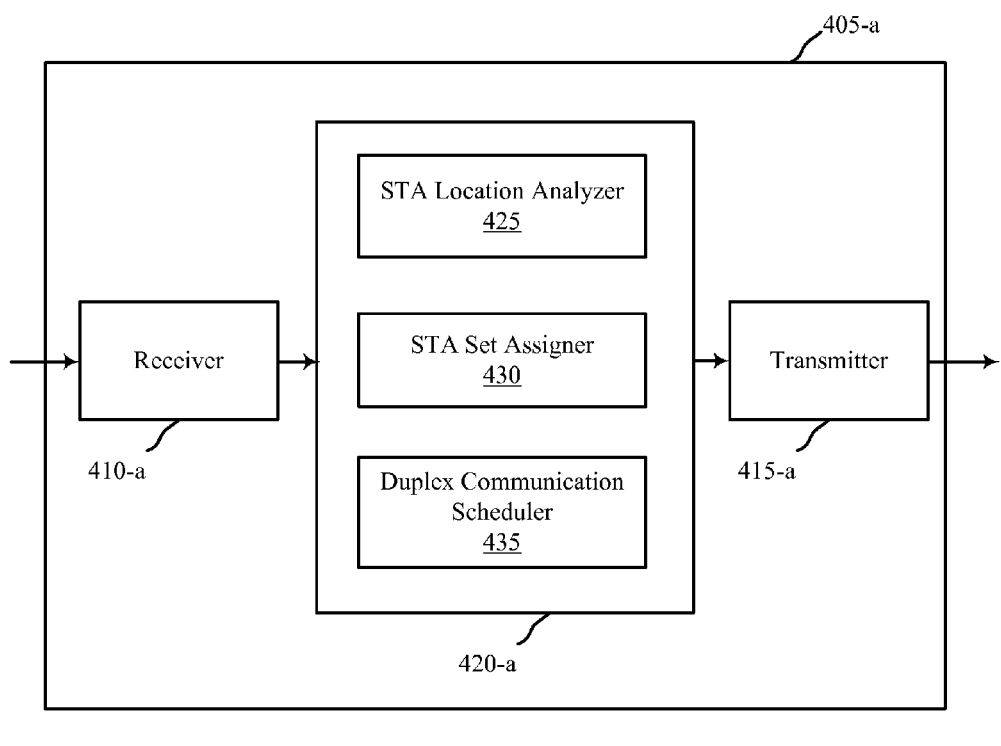
FIG. 4B shows a block diagram illustrating another example of a device that may be used for full duplex communications, in accordance with various aspects of the present disclosure.

FIG. 4B shows a block diagram 400-*b* illustrating another example of a device 405-*a* that may be used for full duplex communications, in accordance with various aspects of the present disclosure. The device 405-*a* may be an example of one or more aspects of the APs 105 described with reference to FIGS. 1, 2A, 2B and 3. The device 405-*a* also may be an example of the device 405 described with reference to FIG. 4A. The device 405-*a* may include a receiver 410-*a*, a communications manager 420-*a*, and/or a transmitter 415-*a*, which may be examples of the corresponding components of the device 405 in FIG. 4A. The device 405-*a* may also include a processor (not shown). Each of these components may be in communication with each other.

The receiver 410-*a* and the transmitter 415-*a* may perform the functions of the receiver 410 and the transmitter 415, respectively, of FIG. 4A. The communications manager 420-*a* may include a STA location analyzer 425, a STA set assigner 430 and a duplex communication scheduler 435.

The STA location analyzer 425 may receive location information regarding a plurality of STAs (not shown) via the receiver 410-*a*. The STA location analyzer 425 may derive locations for each of the STAs using the location information (e.g., RTT and DoA), or may identify the locations of the individual STAs when the location information received from the individual STAs is in the form of a location (e.g., GPS coordinates). The STA location analyzer 425 further may analyze the relative locations of the STAs, and may take into account a location of the device 405 for such analysis.

The STA location analyzer 425 may determine how to divide the STAs into half duplex sets using the derived/identified locations of the STAs. For example, candidate half duplex sets may be determined using the locations of the STAs, such as by grouping STAs together into a candidate set based on a proximity of the STAs to one another. For instance, a threshold or maximum distance between STAs or between individual STAs and a centroid of the candidate set to determine inclusion of a STA in a candidate set. The STA location analyzer 425 may calculate an average physical distance between the STAs of the candidate sets (e.g., based on distances between the STAs of the different candidate sets, or based on a distance between the centroids of the candidate sets). The STA location analyzer 425 may compare the calculated average physical distance to a threshold distance. If the threshold is satisfied by the candidate sets, the STA location analyzer 425 may establish the candidate sets as half duplex sets to be used by the device 405 for duplex communications as described herein.

Alternatively, the STA location analyzer 425 may seek to maximize the average physical distance. In such case, the may establish the candidate sets as half duplex sets to be used by the device 405 for duplex communications when a desired maximization is achieved.

Other factors, in addition to the locations of the STAs, may be considered to determine candidate half duplex sets. For example, the device 405 may have knowledge of the types, sources, etc. of communications that the STAs typically receive and/or transmit. Such knowledge may be obtained through prior communications with the STAs with which the device 405 was involve. Commonalities between STAs regarding prior communications, distribution lists, subscriptions, etc. may be used as indicators that STAs may be considered for candidate sets. Further, capabilities of STAs, such as transmission power control, modulation and coding scheme(s) and/or rate adaptation, OFDMA based transmission, etc., may be considered. Also, power conservation aspects of the STAs (e.g., sleeping periods, low power modes, etc.) may be used for determining half duplex sets.

In conjunction with the STA location analyzer 425, or using half duplex sets determined thereby, the STA set assigner 430 may assign the individual STAs to respective half duplex sets. This may involve the STA set assigner 430 determining a unique identifier (ID) for each of the determined half duplex sets. The STA set assigner 430 may store a list of STAs associated with each ID, for example, in a memory (not shown) of the device 405, to facilitate duplex communications by the device 405 with the half duplex sets.

The STA set assigner 430 also may communicate the respective IDs to the STAs so that the STAs may be readily identified by the device 405 as belonging to a particular half duplex set. The device 405 may track movement of the STAs in conjunction with the assigned IDs, for example, to help determine if a particular half duplex set should be adjusted (e.g., removing a STA from a set if the STA moves too far relative to the set, for example, such that the centroid of the set shifts more than a threshold distance or the proximity of the STAs of the set to one another changes sufficiently). Such an approach may be referred to as dynamic grouping of STAs. It should be understood that various approaches may be used for assigning IDs to STAs, for example, to deal with various communication situations, such as when multiple STAs in a half duplex set are scheduled simultaneously.

The duplex communication scheduler 435 may employ the determined half duplex sets for performing full duplex communications, such as described herein. In the case of more than two half duplex sets being determined, the duplex communication scheduler 435 may determine which pair of the half duplex sets (for UL and DL communications respectively) to select. Such selection may be based on one or more factors, such as which STAs have data waiting for transmission at the device 405, reliability of full duplex communications with the half duplex sets (e.g., amount of interference resulting from full duplex communications, quality of service, etc.), fairness to other half duplex sets, etc.

The duplex communication scheduler 435 also may determine whether full duplex communications should be employed at a given time. For example, the communications manager 420-a of the device 405-a may estimate interference (e.g., based on location) or obtain feedback from the STA(s) at the receiving end. If the interference is below a threshold (e.g., based on cumulative throughput gain with beam forming capability), the device 405-a may continue with half duplex or switch to full duplex. Half duplex may be considered as a subset of full duplex. Scheduling by the device 405-a may take into account or consider additional parameters depending on the capabilities shared by the associated half duplex (e.g., legacy) STAs.

Figure 4C:
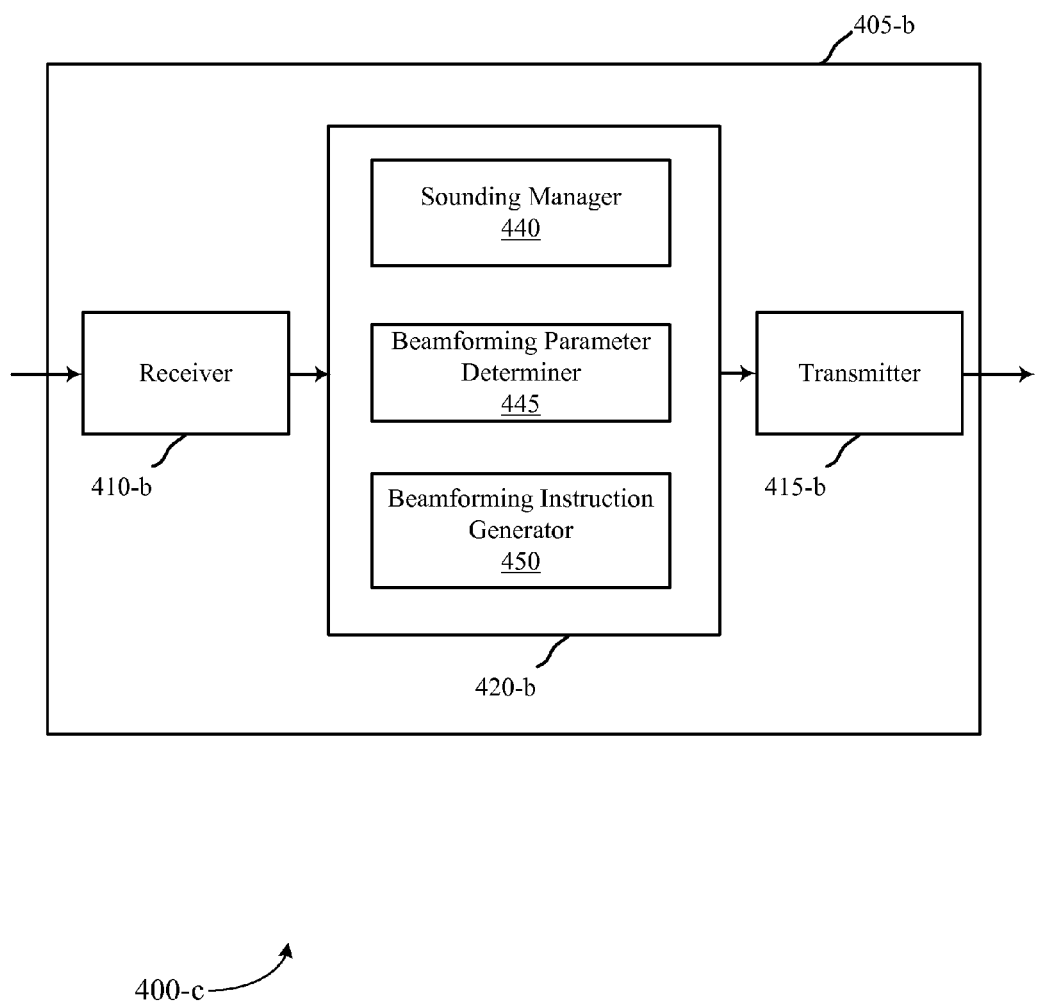
FIG. 4C shows a block diagram illustrating yet another example of a device that may be used for full duplex communications, in accordance with various aspects of the present disclosure.

FIG. 4C shows a block diagram 400-c illustrating another example of a device 405-b that may be used for full duplex communications, in accordance with various aspects of the present disclosure. The device 405-b may be an example of one or more aspects of the APs 105 described with reference to FIGS. 1, 2A, 2B and 3. The device 405-b also may be an example of the devices 405, 405-a described with reference to FIGS. 4A and 4B. The device 405-b may include a receiver 410-b, a communications manager 420-b, and/or a transmitter 415-b, which may be examples of the corresponding components of the devices 405, 405-a in FIGS. 4A and 4B. The device 405-b may also include a processor (not shown). Each of these components may be in communication with each other.

The receiver 410-b and the transmitter 415-b may perform the functions of the receivers 410, 410-a and the transmitters 415, 415-a, respectively, of FIGS. 4A and 4B. The communications manager 420-b may include a sounding manager 440, a beamforming parameter determiner 445 and a beamforming instruction generator 450.

The sounding manager 440 may perform, via the transmitter 415-b and the receiver 410-b, a sounding operation. Details of such a sounding operation are well known in the art and are not set forth herein for the sake of brevity. In the context of this disclosure, the sounding operation may be performed on a half duplex set basis, for example, using the ID assigned to each STA of a set. Thus, CSI obtained from performing the sounding operation with the individual STAs may be associated with the corresponding half-duplex sets. The CSI may be used to generate beamforming weights, which may be applied (e.g., multiplied) to the transmit or receive streams depending on transmit or receive beamforming.

The CSI may be provided to the beamforming parameter determiner 445. Using the CSI, the beamforming parameter determiner 445 may determine suitable beamforming parameters to be used by the STAs of one (or both) of the half duplex sets (e.g., the first half duplex set and/or the second half duplex set as discussed herein) the device 405-b communicates with for performing full duplex communications. In some cases it may be sufficient for only one of the half duplex sets to employ beamforming to reduce caused by the concurrent/simultaneous communications with the device 405-b.

The beamforming instruction generator 450 may receive the determined beamforming parameters from the beamforming parameter determiner 445 along with the ID for the half duplex set that is to perform beamforming. The beamforming instruction generator 450 may create a beamforming instruction to be sent to the STAs of the identified half duplex set, which may be sent via the transmitter 415-b, for example, under control of the communications manager 420-b. The beamforming instruction may cause the STAs of the identified half duplex set involved in communicating to send a transmission that is designed to mitigate interference between the concurrent/simultaneous communications with the device 405-b. For example, the first half duplex set may mitigate interference at the second half duplex set by beamforming to the device 405-b to create a null at the first half duplex set, or the second half duplex set may beamform a null corresponding to the transmission from the first half duplex set.

In some cases, the functions of the beamforming parameter determiner 445 and/or the beamforming instruction generator 450 may be provided at the individual STAs. For example, the device 405-b may send beamforming parameters determined using the appropriate CSI determined by the sounding manager 440 or may send the appropriate CSI to the STAs of a respective half duplex set. When CSI is sent, the CSI provided to the first half duplex set may be the CSI of a channel between the device 405-*s* and the STAs of the first half duplex set and the CSI of a channel between the first half duplex set and the second half duplex set. Similarly, the CSI provided to the second half duplex set may be the CSI of a channel between the device 405-*s* and the STAs of the second half duplex set and the CSI of a channel between the second half duplex set and the first half duplex set. As noted above, it may be sufficient for the device 405 to provide CSI to only one of the half duplex sets for beamforming. In the case of multiple STAs in a same half duplex set communicating with the device 405-*b*, beamforming may be used at the device 405-*b* as well.

Figure 5A:
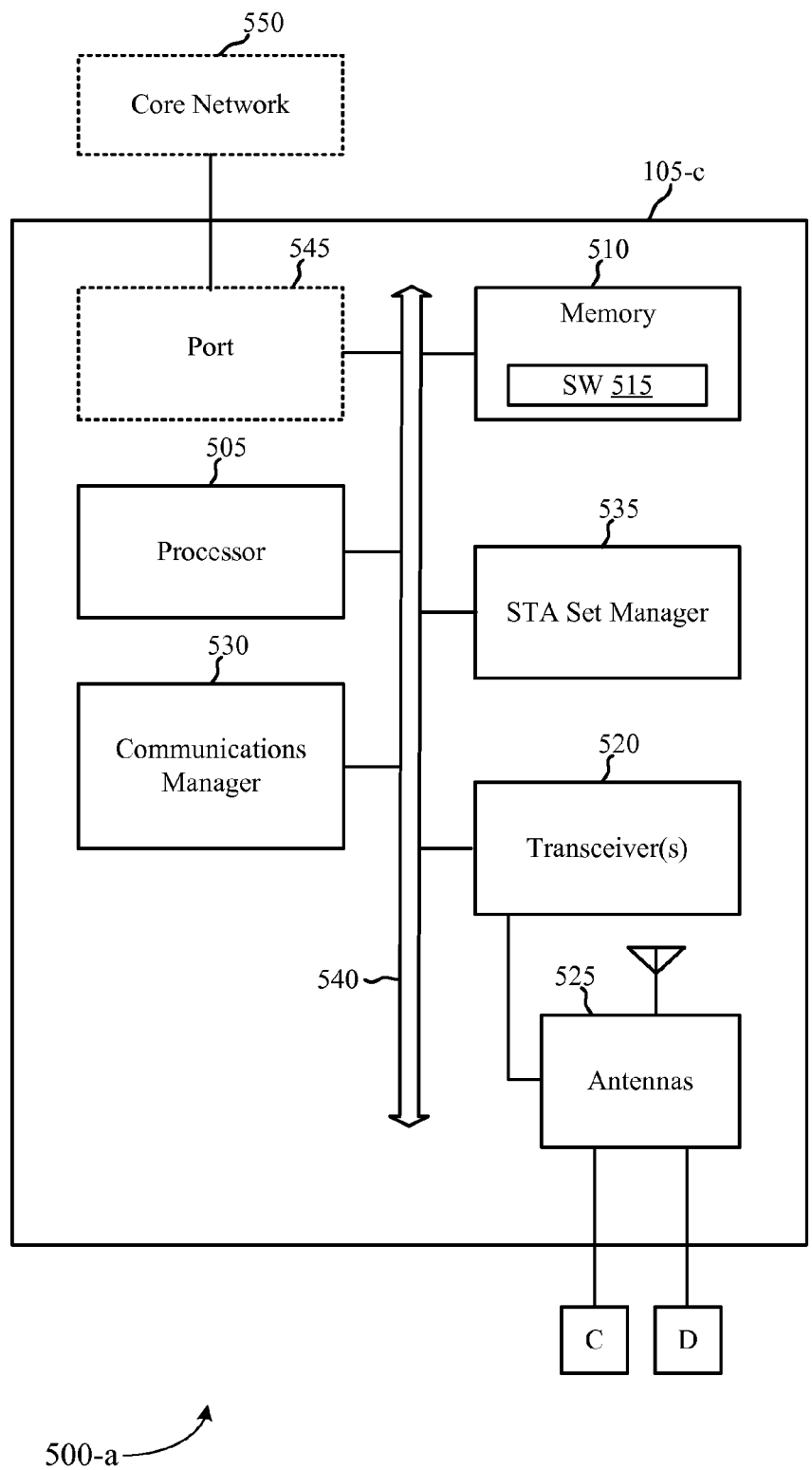
FIG. 5A shows a block diagram illustrating an example of a system including a device that may be used for full duplex communications, in accordance with various aspects of the present disclosure.

FIG. 5A shows a block diagram illustrating an example of a system 500-*a* including an AP 105-*c* that may be used for full duplex communications, in accordance with various aspects of the present disclosure. The AP 105-*c* may be an example of the one or more of the APs 105 described with reference to FIGS. 1, 2A and 2B, or an example of one or more of the devices 405 described with reference to FIGS. 4A-4C. The AP 105-*c* may include a processor 505, a memory 510 (including software (SW) 515), at least one transceiver 520, and at least one antenna 525. Each of these components may be in communication, directly or indirectly, with one another (e.g., over a bus 540).

The transceiver(s) 520 may be configured to communicate bi-directionally, via the antenna(s) 525, a first half duplex set C and a second half duplex set D. The transceiver(s) 520 (or other components of AP 105-*c*) may also be configured to communicate bi-directionally, via the antenna(s) 525, with individual STAs (not shown) or other APs (not shown). The transceiver(s) 520 may include a modem configured to modulate the packets and provide the modulated packets to the antennas 840 for transmission, and to demodulate packets received from the antenna(s) 525. The AP 105-*c* may include multiple transceivers 520, each with one or more associated antennas 525. The transceiver(s) 520 may be an example of a combined receiver 410 and transmitter 415 of FIG. 4A, for example.

The memory 510 may include random access memory (RAM) and read only memory (ROM). The memory 510 may also store computer-readable, computer-executable software code 515 containing instructions that are configured to, when executed, cause the processor 505 to perform various functions described herein (e.g., determine half duplex sets for full duplex communications at the AP 105-*c*, etc.). Alternatively, the computer-executable software code 515 may not be directly executable by the processor 505 but may be configured to cause (e.g., when compiled and executed) the AP 105-*c* to perform functions described herein.

The processor 505 may include an intelligent hardware device (e.g., a CPU, a microcontroller, an ASIC, etc.). The processor 505 may include various special purpose processors such as encoders, queue processing modules, base band processors, radio head controllers, DSPs, and the like.

The AP 105-*c* may include a communications manager 530, which may be an example of the communications managers 420 described with reference to FIGS. 4A-4C. The communications manager 530 may include various subcomponents, such as described with reference to FIGS. 4B and 4C, to carry out various functions described above and further below (e.g., schedule and/or coordinate full duplex communications at the AP 105-*c*, facilitate beamforming at the STAs, etc.).

The AP 105-*c* may include a STA set manager 535, which may perform various functions related to the half duplex sets of STAs (e.g., dividing, assigning, identifying, etc.). Further, the STA set manager 535 may cooperate with the communications manager 530 to carry out the functions thereof with respect to full duplex communications at the AP 105-*c*.

The AP 105-*c* may have one or more wired backhaul links. AP 105-*c* may have a wired backhaul link (e.g., a port 545, S1 interface, etc.) for communicating with a network 550. The AP 105-*c* also may communicate with other base stations (not shown) via inter-base station backhaul links (also not shown). In some cases, the AP 105-*c* may communicate with other APs using the communications manager 530 or an AP-specific communications manager (not shown), which may provide an X2 interface within an LTE/LTE-A wireless communication network technology to provide communication between APs. The AP 105-*c* also may communicate with the network 550 using the communications manager 530 or a network-specific communications manager (not shown).

Figure 5B:
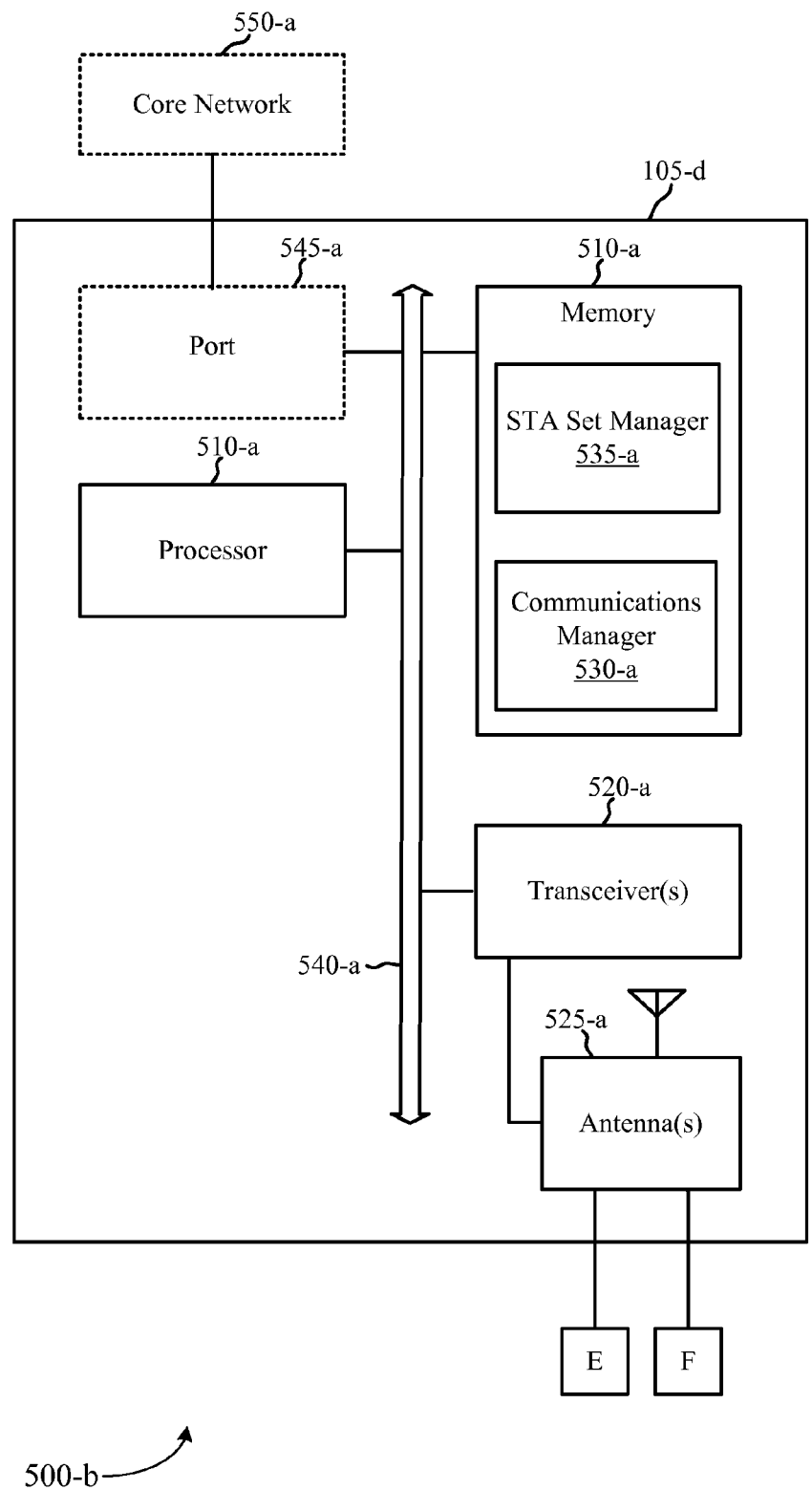
FIG. 5B shows a block diagram illustrating a system including another example of a device that may be used for full duplex communications, in accordance with various aspects of the present disclosure.

FIG. 5B shows a block diagram illustrating a system 500-*b* including an AP 105-*d* that may be used for full duplex communications, in accordance with various aspects of the present disclosure. The AP 105-*d* may be an example of the one or more of the APs 105 described with reference to FIGS. 1, 2A and 2B, an example of one or more of the devices 405 described with reference to FIGS. 4A-4C, or an example of the AP 105-*c* described with reference to FIG. 5A. The AP 105-*d* may include a processor 505-*a*, a memory 510-*a*, at least one transceiver 520-*a*, and at least one antenna 525-*a*. Each of these components may be in communication, directly or indirectly, with one another (e.g., over a bus 540-*a*). Each of these components may perform the functions described above with reference to FIG. 5A.

In this example, the memory 510-*a* may include software that performs the functionality of a communications manager 530-*a* and a STA set manager 535-*a*. For example, memory 510-*a* may include software that, when compiled and executed, causes the processor 505-*a* (or other components of the AP 105-*d*) to perform the functionality described above and further below. A subset of the functionality of the communications manager 530-*a* and the STA set manager 535-*a* may be included in memory 510-*a*; alternatively, all such functionality may be implemented as software executed by the processor 505-*a* to cause the AP 105-*d* to perform such functions. Other combinations of hardware/software may be used to perform the functions of the communications manager 530-*a* and a STA set manager 535-*a*.

Figure 6:
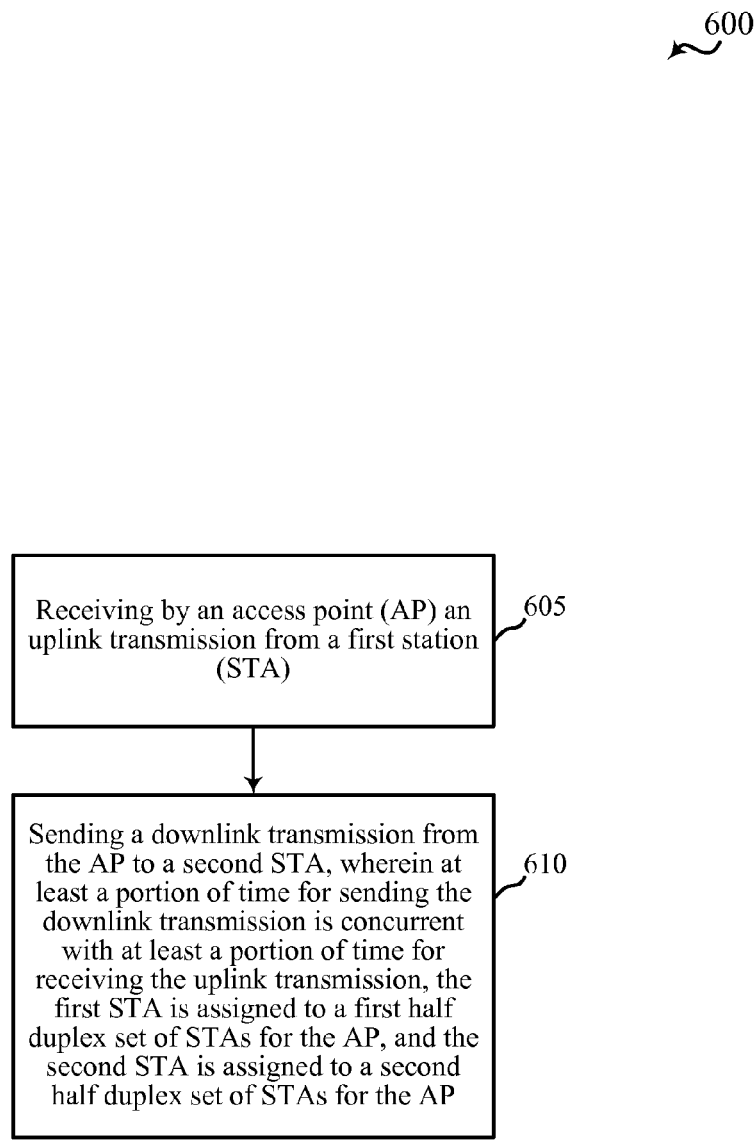
FIG. 6 shows a flow chart illustrating an example of a method for full duplex wireless communication, in accordance with various aspects of the present disclosure.

FIG. 6 shows a flow chart illustrating an example of a method 600 for full duplex wireless communication, in accordance with various aspects of the present disclosure. For clarity, the method 600 is described below with reference to aspects of one or more of the APs 105 described with reference to FIGS. 1-3, 5A and 5B, and/or aspects of one or more of the devices described with reference to FIGS. 4A-4C. The operations of method 600 may be implemented by such an AP/device or components thereof, such as described above. For example, the operations of method 600 may be performed by the communications manager 420 described with reference to FIGS. 4A-4C, or a combination of the communications manager 530 and the STA set manager 535 described with reference to FIGS. 5A and 5B. The AP/device may execute a set of codes to control the functional elements of the AP to perform the functions described below. Additionally or alternatively, the AP/device may perform aspects the functions described below using special-purpose hardware.

At block 605, an AP may receive an uplink transmission from a first STA. At block 610, the AP may concurrently send a downlink transmission to a second STA, with the first STA being assigned to a first half duplex set of STAs for the AP and the second STA being assigned to a second half duplex set of STAs for the AP. The downlink transmission may be concurrent with the uplink transmission such that at least a portion of time for sending the downlink transmission may be concurrent with at least a portion of time for receiving the uplink transmission. The operation(s) at block 605 may be performed by the receiver 410-a and the duplex communication scheduler 435 of the communications manager 420-a as described above with reference to FIG. 4B. The operation(s) at block 610 may be performed by the transmitter 415-a and the duplex communication scheduler 435 of the communications manager 420-a as described above with reference to FIG. 4B. In the case where the STAs are not pre-divided into first and second half duplex sets, such dividing may be performed by the STA location analyzer 425 of the communications manager 420-a as described above with reference to FIG. 4B.

According to the method 600, the AP may perform full duplex communications. As described herein, such full duplex communications may include an uplink transmission from a STA of the first half duplex set to the AP and a simultaneous downlink transmission from the AP to a STA of the second half duplex set. Further, the full duplex communications may include an uplink transmission from a STA of the second half duplex set to the AP and a simultaneous downlink transmission from the AP to a STA of the first half duplex set. As such, the terms "first" and "second" used in the method 600 may simply distinguish between two STAs belonging to different groups of STAs. Further, it should be understood that the alternative full duplex communications may occur at different times, because the STAs of the first and second half duplex sets may be capable of half duplex communications (e.g., communicating in either UL or DL at a given time) and not full duplex communications (e.g., communicating in both UL and DL simultaneously).

Figure 7:
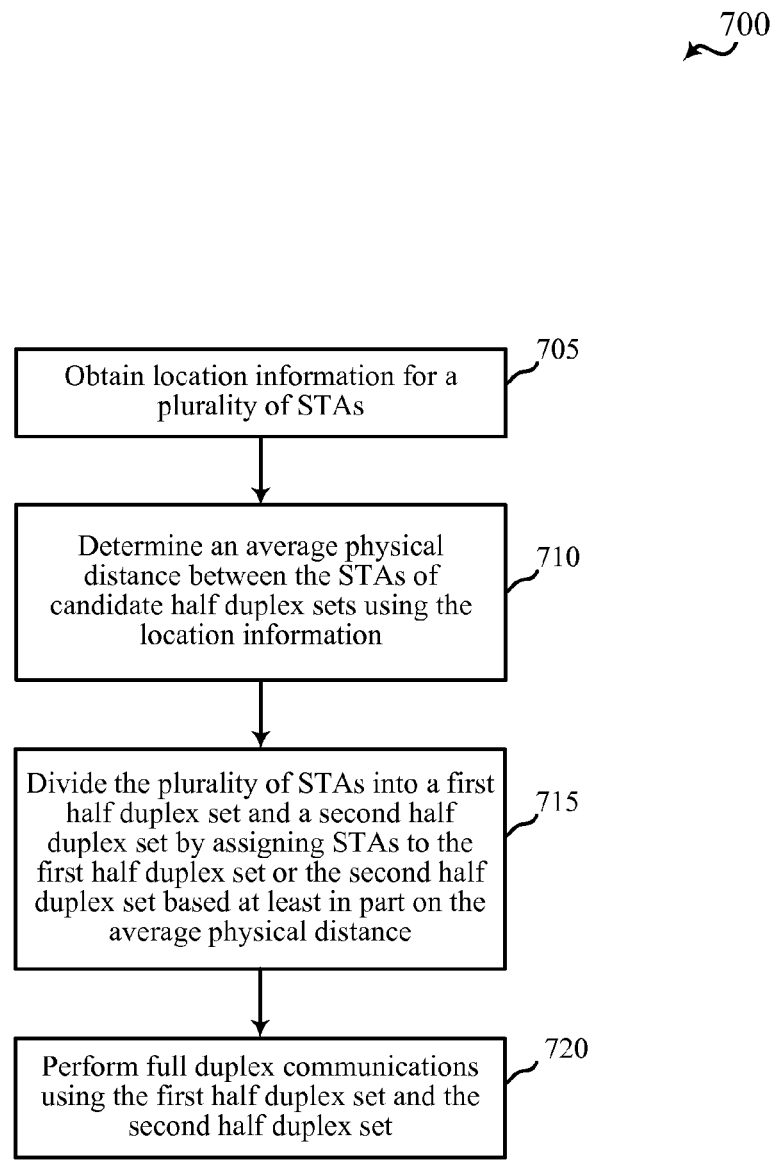
FIG. 7 shows a flow chart illustrating another example of a method for full duplex wireless communication, in accordance with various aspects of the present disclosure.

FIG. 7 shows a flow chart illustrating another example of a method 700 for full duplex wireless communication, in accordance with various aspects of the present disclosure. For clarity, the method 700 is described below with reference to aspects of one or more of the APs 105 described with reference to FIGS. 1-3, 5A and 5B, and/or aspects of one or more of the devices described with reference to FIGS. 4A-4C. The operations of method 700 may be implemented by such an AP/device or components thereof, such as described above. For example, the operations of method 700 may be performed by the communications manager 420 described with reference to FIGS. 4A-4C, or a combination of the communications manager 530 and the STA set manager 535 described with reference to FIGS. 5A and 5B. The AP/device may execute a set of codes to control the functional elements of the AP to perform the functions described below. Additionally or alternatively, the AP/device may perform aspects the functions described below using special-purpose hardware.

At block 705, an AP may obtain location information for a plurality of STAs that are within the coverage area of the AP. For example, the operation(s) at block 705 may be performed by the STA location analyzer 425 of the communications manager 420-a as described above with reference to FIG. 4B. Various methodologies may be employed to obtain location information of the STAs, including the examples described above.

At block 710, the AP may determine an average physical distance between the STAs of candidate half duplex sets using the obtained location information. For example, the operation(s) at block 710 may be performed by the STA location analyzer 425 of the communications manager 420-a as described above with reference to FIG. 4B.

At block 715, the AP may divide the plurality of STAs into a first half duplex set and a second half duplex set by assigning STAs to the first half duplex set or the second half duplex set based at least in part on the average physical distance. For example, the operation(s) at block 715 may be performed by the STA location analyzer 425 of the communications manager 420-a as described above with reference to FIG. 4B. The STA location analyzer 425 may compare the calculated average physical distance to a threshold distance. If the threshold is satisfied by the candidate sets, the STA location analyzer 425 may establish the candidate sets as half duplex sets to be used by the AP. Alternatively, candidate sets may be established as half duplex sets to be used by the AP by maximizing the average physical distance.

Then, at block 720, the AP may perform full duplex communications using the first half duplex set and the second half duplex set. For example, the operation(s) at block 720 may be performed by the duplex communication scheduler 435 of the communications manager 420-a, in conjunction with the receiver 410-a and the transmitter 415-a, as described above with reference to FIG. 4B.

Figure 8:
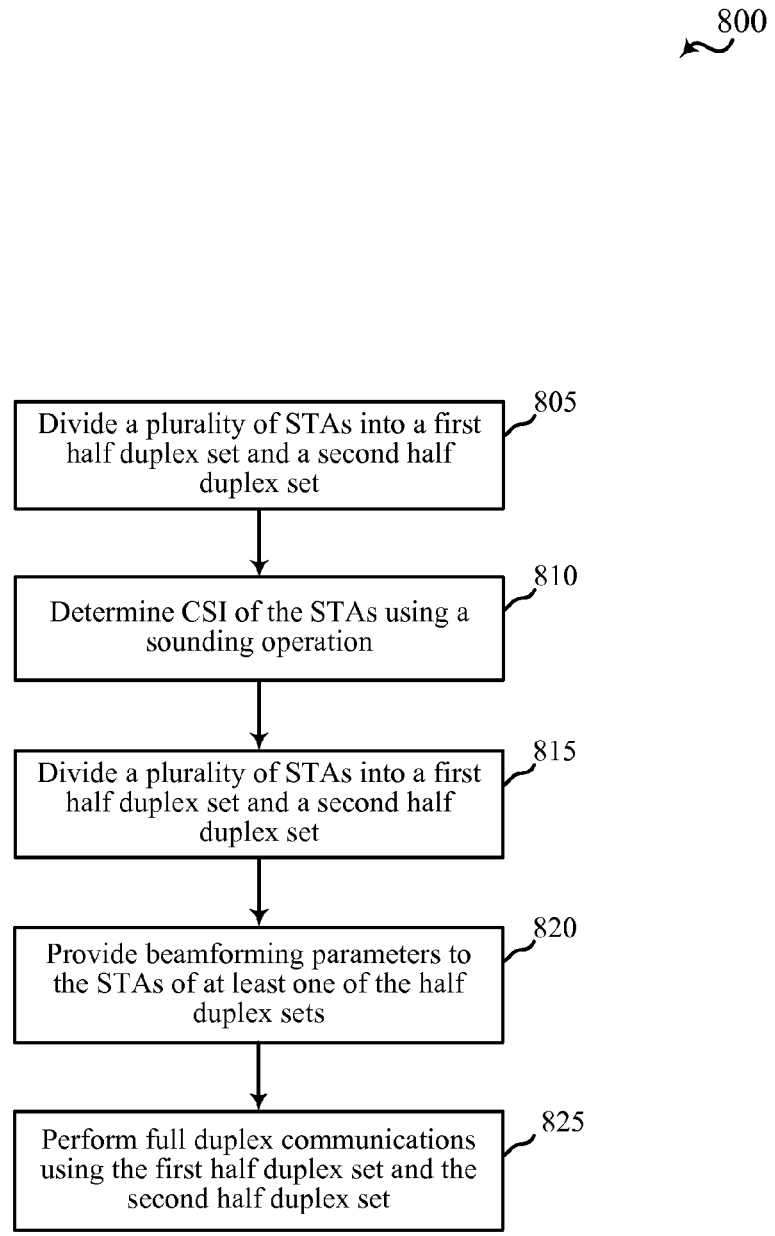
FIG. 8 shows a flow chart illustrating another example of a method for full duplex wireless communication, in accordance with various aspects of the present disclosure.

FIG. 8 shows a flow chart illustrating another example of a method 800 for full duplex wireless communication, in accordance with various aspects of the present disclosure. For clarity, the method 800 is described below with reference to aspects of one or more of the APs 105 described with reference to FIGS. 1-3, 5A and 5B, and/or aspects of one or more of the devices described with reference to FIGS. 4A-4C. The operations of method 800 may be implemented by such an AP/device or components thereof, such as described above. For example, the operations of method 800 may be performed by the communications manager 420 described with reference to FIGS. 4A-4C, or a combination of the communications manager 530 and the STA set manager 535 described with reference to FIGS. 5A and 5B. The AP/device may execute a set of codes to control the functional elements of the AP to perform the functions described below. Additionally or alternatively, the AP/device may perform aspects the functions described below using special-purpose hardware.

At block 805, an AP may divide a plurality of STAs into a first half duplex set and a second half duplex set. For example, the operation(s) at block 605 may be performed by the STA location analyzer 425 of the communications manager 420-a as described above with reference to FIG. 4B.

At block 810, the AP may determine CSI of the STAs using a sounding operation. For example, the operation(s) at block 810 may be performed by the sounding manager 440 of the communications manager 420-b as described above with reference to FIG. 4C.

At block 815, the AP may divide the plurality of STAs into a first half duplex set and a second half duplex set by assigning STAs to the first half duplex set or the second half duplex set. For example, the operation(s) at block 815 may be performed by the STA location analyzer 425 of the communications manager 420-a as described above with reference to FIG. 4B.

At block 820, the AP may provide beamforming parameters to the STAs of at least one of the half duplex sets. The beamforming parameters may be based at least in part on the CSI determined at block 810. As an alternative, the CSI determined at block 810 may be provided to the STAs of at least one of the half duplex sets, for example, where the STAs are capable of determining and implementing beamforming using the CSI.

Then, at block 825, the AP may perform full duplex communications using the first half duplex set and the second half duplex set. For example, the operation(s) at block 825 may be performed by the duplex communication scheduler 435 of the communications manager 420-*a*, in conjunction with the receiver 410-*a* and the transmitter 415-*a*, as described above with reference to FIG. 4B. Such full duplex communications may be performed, for example, with either the first half duplex set or the second half duplex set utilizing beamforming in accordance with the beamforming parameters provided at block 820.

The methods 600, 700, 800, 900 and 1000 may provide for full duplex communications at an AP or similar device. It should be noted that these methods are just example implementations and that the operations of thereof may be rearranged or otherwise modified such that other implementations are possible. For example, aspects from two or more of the methods 600, 700, 800, 900 and 1000 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   obtaining by an access point (AP) location information of a first station (STA) and a second STA;
   identifying the first STA as belonging to a first half duplex set of STAs based at least in part on the location information of the first STA;
   identifying the second STA as belonging to a second half duplex set of STAs based at least in part on the location information of the second STA;

receiving by the AP an uplink transmission from the first STA; and sending a downlink transmission from the AP to the second STA, wherein at least a portion of time for sending the downlink transmission is concurrent with at least a portion of time for receiving the uplink transmission.

2. The method of claim 1, further comprising:
sending a second downlink transmission from the AP to a STA of the first half duplex set of STAs; and
receiving a second uplink transmission from a STA of the second half duplex set of STAs, wherein at least a portion of time for sending the second downlink transmission is concurrent with at least a portion of time for receiving the second uplink transmission.

3. The method of claim 1, wherein the location information of the first STA, the location information of the second STA, or both, is based at least in part on at least one selected from the group consisting of: round trip time (RTT) and direction of arrival (DoA) of signals relative to the AP.

4. The method of claim 1, wherein identifying the first STA as belonging to the first half duplex set is based at least in part on an average physical distance between STAs of the first half duplex set and STAs of the second half duplex set.

5. The method of claim 4, wherein the first STA is identified as belonging to the first half duplex set if the average physical distance between the STAs of the first half duplex set and the STAs of the second half duplex set is greater than a threshold distance.

6. The method of claim 4, wherein the first STA is identified as belonging to the first half duplex set if the average physical distance between the STAs of the first half duplex set and the STAs of the second half duplex set is maximized.

7. The method of claim 1 further comprising:
excluding at least one STA from both the first half duplex set and the second half duplex set based at least in part on location information for the at least one STA.

8. The method of claim 1, further comprising:
providing beamforming parameters to STAs of the first half duplex set, the second half duplex set, or both, wherein the AP performs full duplex operations using the beamforming parameters to reduce interference between the first half duplex set and the second half duplex set.

9. The method of claim 8, further comprising:
determining, using a sounding operation, channel state information (CSI) of at least one selected from the group consisting of: a channel between the AP and the first STA, a channel between the AP and the second STA and a channel between the first STA and the second STA; and
determining the beamforming parameters based at least in part on the determined CSI.

10. An apparatus for wireless communication, comprising:
a receiver of an access point (AP) to obtain location information of a first station (STA) and a second STA and receive an uplink transmission from the first STA;
a communications manager of the AP to identify the first STA as belonging to a first half duplex set of STAs based at least in part on the location information of the first STA and identify the second STA as belonging to a second half duplex set of STAs based at least in part on the location information of the second STA; and
a transmitter of the AP to send a downlink transmission from the AP to the second STA, wherein at least a portion of time for sending the downlink transmission is concurrent with at least a portion of time for receiving the uplink transmission.

11. The apparatus of claim 10, wherein:
the transmitter further sends a second downlink transmission from the AP to a STA of the first half duplex set; and
the receiver receives a second uplink transmission from a STA of the second half duplex set, wherein at least a portion of time for sending the second downlink transmission is concurrent with at least a portion of time for receiving the second uplink transmission.

12. The apparatus of claim 10, wherein the receiver is to obtain the location information of the first STA, the location information of the second STA, or both, based at least in part on at least one selected from the group consisting of: round trip time (RTT) and direction of arrival (DoA) of signals relative to the AP.

13. The apparatus of claim 10, wherein the communications manager is to identify the first STA as belonging to the first half duplex set based at least in part on an average physical distance between STAs of the first half duplex set and STAs of the second half duplex set.

14. The apparatus of claim 13, wherein the communications manager is to identify the first STA as belonging to the first half duplex set if the average physical distance between the STAs of the first half duplex set and the STAs of the second half duplex set is greater than a threshold distance.

15. The apparatus of claim 13, wherein the communications manager is to identify the first STA as belonging to the first half duplex set if the average physical distance between the STAs of the first half duplex set and the STAs of the second half duplex set is maximized.

16. The apparatus of claim 10, wherein the communications manager is to exclude at least one STA from both the first half duplex set and the second half duplex set based at least in part on location information for the at least one STA.

17. The apparatus of claim 10, wherein:
the receiver is to provide beamforming parameters to STAs of the first half duplex set, the second half duplex set, or both, wherein the receiver and the transmitter of the AP perform full-duplex operations using the beamforming parameters to reduce interference between the first half duplex set and the second half duplex set.

18. The apparatus of claim 17, wherein:
the communications manager is to:
determine, using a sounding operation, channel state information (CSI) of at least one selected from the group consisting of: a channel between the AP and the first STA, a channel between the AP and the second STA and a channel between the first STA and the second STA, and
determine the beamforming parameters based at least in part on the determined CSI.

19. An apparatus for wireless communication, comprising:
means for obtaining by an access point (AP) location information of a first station (STA) and a second STA;
means for identifying the first STA as belonging to a first half duplex set of STAs based at least in part on the location information of the first STA and identifying the second STA as belonging to a second half duplex set of STAs based at least in part on the location information of the second STA;
means for receiving by the AP an uplink transmission from the first STA; and means for sending a downlink transmission from the AP to the second STA, wherein at least a portion of time for sending the downlink transmission is concurrent with at least a portion of time for receiving the uplink transmission.

20. The apparatus of claim 19, wherein the location information of the first STA, the location information of the second STA, or both, is based at least in part on at least one selected from the group consisting of: round trip time (RTT) and direction of arrival (DoA) of signals relative to the AP.

21. The apparatus of claim 19, wherein the means for identifying identifies the first STA as belonging to the first half duplex set based at least in part on an average physical distance between STAs of the first half duplex set and STAs of the second half duplex set.

22. The apparatus of claim 21, wherein the means for identifying identifies the first STA as belonging to the first half duplex set if the average physical distance between the STAs of the first half duplex set and the STAs of the second half duplex set is greater than a threshold distance.

23. The apparatus of claim 21, wherein the means for identifying identifies the first STA as belonging to the first half duplex set if the average physical distance between the STAs of the first half duplex set and the STAs of the second half duplex set is maximized.

24. The apparatus of claim 19, further comprising:
means for excluding at least one STA from both the first half duplex set and the second half duplex set based at least in part on location information for the at least one STA.

25. The apparatus of claim 19, further comprising:
means for providing beamforming parameters to STAs of the first half duplex set, the second half duplex set, or both, wherein the AP performs full duplex operations using the beamforming parameters to reduce interference between the first half duplex set and the second half duplex set.

26. The apparatus of claim 25, further comprising:
means for determining, using a sounding operation, channel state information (CSI) of at least one selected from the group consisting of: a channel between the AP and the first STA, a channel between the AP and the second STA and a channel between the first STA and the second STA; and
means for determining the beamforming parameters based at least in part on the determined CSI.

27. A non-transitory computer-readable medium storing code for communication at a wireless device, the code comprising instructions executable by a processor to cause the wireless device to:
obtain by an access point (AP) location information of a first station (STA) and a second STA;
identify the first STA as belonging to the first half duplex set of STAs based at least in part on the location information of the first STA;
identify the second STA as belonging to the second half duplex set of STAs based at least in part on the location information of the second STA;
receive by the AP an uplink transmission from the first STA; and
send a downlink transmission from the AP to the second STA, wherein at least a portion of time for sending the downlink transmission is concurrent with at least a portion of time for receiving the uplink transmission.

* * * * *